United States Patent
Kittel et al.

[11] Patent Number: 5,984,656
[45] Date of Patent: Nov. 16, 1999

[54] FORMING PUNCH FOR POSTFORMING OF A SHAPED CORD ON AN OBJECT

[75] Inventors: Florez Kittel, Würselen; Helmut Krumm, Aachen, both of Germany

[73] Assignee: Saint-Gobain Vitrage, Courbevoie, France

[21] Appl. No.: 08/907,018

[22] Filed: Aug. 6, 1997

[30] Foreign Application Priority Data

Aug. 9, 1996 [DE] Germany ............ 196 32 149

[51] Int. Cl.⁶ ............ B29C 33/42; B29C 45/14; B29C 43/28
[52] U.S. Cl. ............ 425/125; 264/163; 264/252; 264/254; 264/296; 425/127; 425/296; 425/298; 425/403
[58] Field of Search ............ 264/252, 254, 264/296, 163; 425/125, 127, 403, 296, 298, 129.1

[56] References Cited

U.S. PATENT DOCUMENTS

| | | | |
|---|---|---|---|
| 2,916,771 | 12/1959 | Lang et al. | 425/403 |
| 4,521,175 | 6/1985 | Medwed | 425/403 |
| 4,728,381 | 3/1988 | Jezuit et al. | 425/125 |
| 5,057,265 | 10/1991 | Kunert et al. | 264/511 |
| 5,302,333 | 4/1994 | Capriotti et al. | 264/252 |
| 5,316,829 | 5/1994 | Cordes et al. | 296/93 |
| 5,456,874 | 10/1995 | Cordes et al. | 264/138 |
| 5,519,979 | 5/1996 | Kunert et al. | 296/93 |
| 5,547,359 | 8/1996 | Cordes et al. | 425/125 |
| 5,580,628 | 12/1996 | Cordes et al. | 296/93 |
| 5,648,036 | 7/1997 | Glang et al. | 425/127 |

FOREIGN PATENT DOCUMENTS

WO 95/35193  12/1995  WIPO.
WO 96/19339  6/1996  WIPO.

*Primary Examiner*—Robert Davis
*Attorney, Agent, or Firm*—Pennie & Edmonds LLP

[57] ABSTRACT

The forming surface of a forming mold (5) for postforming of a shaped cord (2) in the shape of a frame extruded onto a glass (1) is slightly curved in the direction of the length of shaped cord (2). In the final position of forming mold (4) during the postforming operation, lateral edges (11, 12) are thus slightly above the surface of shaped cord (2). This avoids the creation of imprints in the form of lines or edges on the shaped cord, and a smooth transition is achieved between the postformed length of the shaped cord that attaches there.

15 Claims, 2 Drawing Sheets

FORMING PUNCH FOR POSTFORMING OF A SHAPED CORD ON AN OBJECT

BACKGROUND OF THE INVENTION

This invention pertains to a forming mold for postforming of an shaped polymer cord that is extruded onto an object.

It is known that vehicle windows are equipped with a frame or frame-shaped elements by extruding directly onto a glass a shaped cord that is made of an extrudable polymer in a corresponding manner. Likewise, other plate-like objects such as, for example, doors can be equipped with a frame-shaped sealing joint. Generally, however, the shaped cord extruded onto the object has to be postformed in certain places, for instance, in the transition zone between the beginning and end of a closed frame. Such postforming may also be necessary or advantageous in the area of the corners of a shaped frame, particularly in the case of sharp corners.

Extrudable polymers that are used for the above-mentioned purposes include both reaction systems, for example, polyurethane systems that harden under the action of moisture, and thermoplastic systems. In the case of reaction systems, the postforming may be done right after the extrusion operation before the extruded polymer cord hardens. Such a postforming process and the appropriate compression molds for implementing it are described in documents U.S. Pat. No. 5,519,979 and German patent no. DE-G-U1 90 11 573. In the case of a reaction system, the postforming may also be done after the shaped cord hardens. A corresponding process and an appropriate mold for implementing it, comprising a forming mold, are the objects of documents U.S. Pat. No. 5,057,265.

Devices that comprise a forming mold for the postforming of the transition zone of a thermoplastic polymer frame that is extruded onto a glass are described in documents WO 95/35193 and WO 96/19339.

In all of the known devices for postforming, the forming surface of the forming mold is adapted over its entire length to the geometry of the extruded shaped cord. This means that, for example, in the case of an extruded frame on a flat glass, the shaped forming surface is rectilinear.

When postforming is done with the aid of the known forming mold, it may happen that joint lines, which are caused by the edges at the end faces of the forming mold, are visible at the transition points between the postformed section length and the lengths of the initial extruded sections. Such visible joint lines show up in particular when the dimensions, in terms of height, of the shaped extruded cord or the shape and thickness of the objects vary slightly within the limits of the given tolerances.

SUMMARY OF THE INVENTION

The object of the invention is to provide a tool of the type mentioned in the preamble for the purpose of localized postforming of a shaped cord that is extruded onto an object, in which the occurrence of visible joint lines between the postformed zone and the shaped cord adjacent thereto is avoided.

This object is achieved, according to the invention, by virtue of the fact that the forming surface of the forming mold is curved, at least in the lateral end areas, in the direction of the length of the shaped cord.

In this case, the extent of the curvature should be selected such that, when the mold is in its final position in the postforming operation, the lateral edges of the forming surface are no longer in contact with the surface of the shaped cord, even in the case where the thickness of the shaped cord is at the upper limit of the tolerance range, but still considerably above said surface. It has been found that, as a general rule, this condition is satisfied when the difference in height between the zones of the forming mold that are adjacent to the surface of the object and the corresponding edges of the forming surface at the end faces of the forming mold is 0.1 to 1 mm, and preferably 0.2 to 0.6 mm. In this way, no imprint in the form of a line or edge is created; rather, in each case, there is a smooth gradual transition between the postformed length and the shaped-cord lengths attached thereto. In the majority of the cases, this gradual transition is not visible to the naked eye, and the shaped cord is uniform in appearance in this zone as well.

According to an advantageous development of the invention, the forming surface of the forming mold is provided with a constant curvature over its entire length. In the case of such a forming mold with a length of 8 cm, for example, as is appropriate for the postforming of the transition area between the beginning and end of a shaped cord, a difference in height of 0.5 mm between the edges of the forming surface and the lowest point is reached when the radius of the circular curvature of the forming surface is approximately 1500 mm. For technical reasons, forming molds that have the same radius of curvature over their entire length can be more easily manufactured than can forming molds that have only curved end areas. The area of a shaped cord that is postformed with the aid of such a forming mold is homogeneous in appearance and creates no discontinuity in the postformed surface.

The forming molds designed according to the invention can be used to the same advantage for all known postforming processes since the basic problem is observed in principle in all of the postforming processes described in the preamble.

Other features and advantages of the invention will emerge from the dependent claims and the following description of embodiments, with reference to the attached drawings.

DETAILED DESCRIPTION OF THE INVENTION

Figure 1:
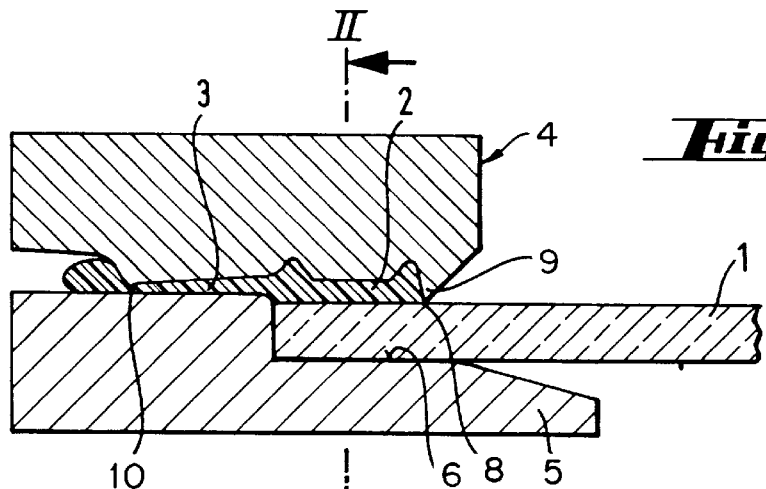
FIG. 1 is a schematic representation of a cross-section of a tool for postforming a shaped thermoplastic cord.

Onto the edge of a glass 1 is extruded a shaped cord 2, which has a sealing and centering lip 3 that protrudes beyond the edge of glass 1. In the transition zone between the beginning and end of extruded shaped cord 2, 3, the shaped cord is to be postformed. In the case shown, shaped cord 2, 3 is made of a thermoplastic elastomer. For postforming, in this case a heated forming mold 4 is used. To postform lip 3, forming mold 4 works with a corresponding die 5, which is equipped with a cavity 6 into which the edge of glass 1 is inserted.

In order to carry out postforming, forming mold 4 is lowered onto shaped cord 2 in an inclined position such that edge 8 of wedge-shaped protrusion 9 touches the glass surface. Forming mold 4 is then caused to pivot around edge 8 until outside cutting edge 10 touches the surface of die 5. During this pivoting operation, the postforming of shaped cord 2 and lip 3 takes place. In effect, the height of a part of the shaped cord 2 above the glass 1 is reduced and the excess portion of the polymer compound that has flowed out during this operation is cut away by cutting edge 10.

Figure 2:
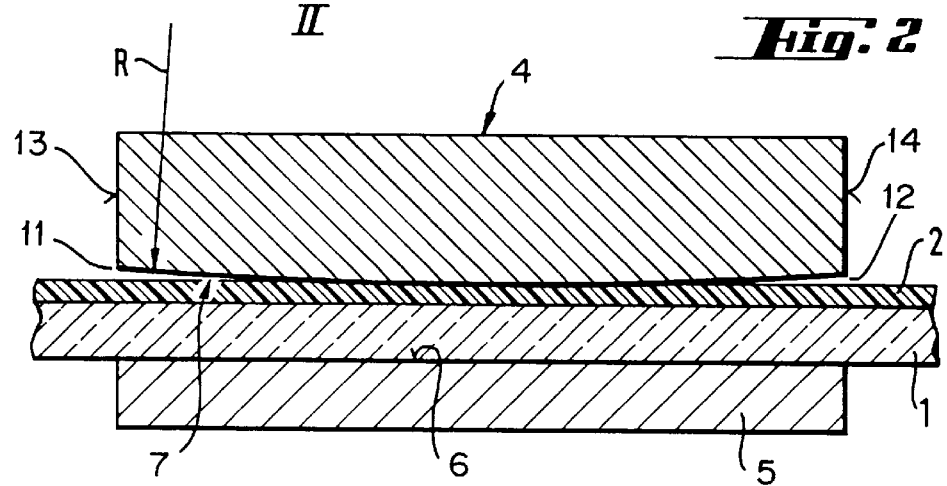
FIG. 2 is a longitudinal-section view in plane II—II of FIG. 1.
Figure 3:
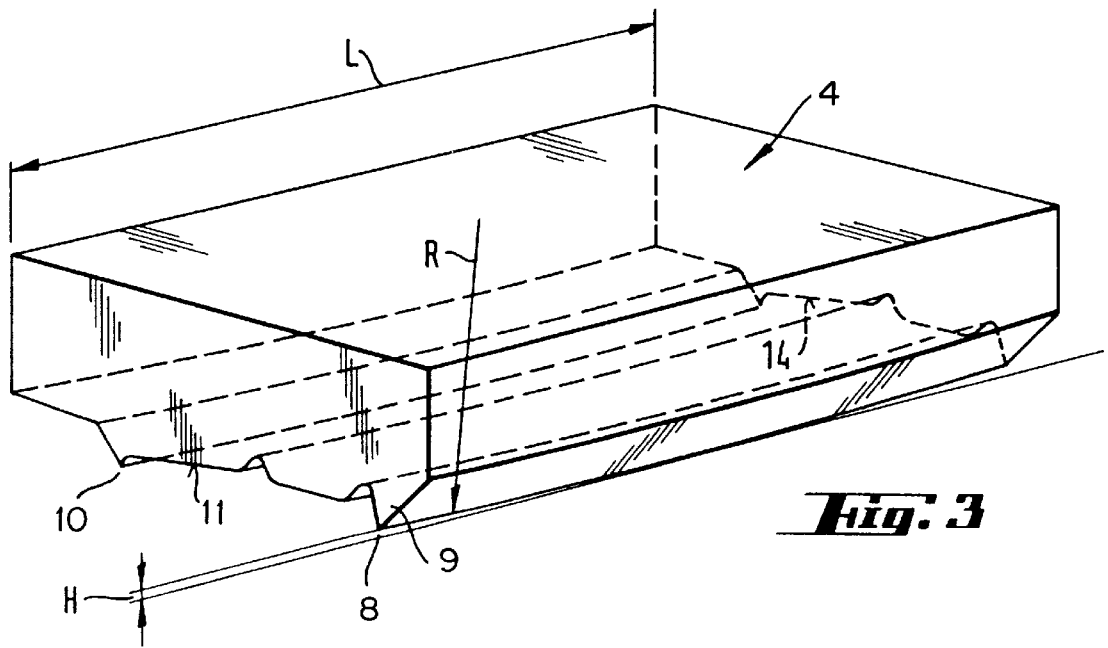
FIG. 3 is a perspective view of a forming mold according to the invention for the tool depicted in FIG. 1.

The curvature, according to the invention, of forming mold 4 is shown in FIGS. 2 and 3. Overall, forming surface 7 has a slight cylindrical curvature. The extent of the curvature is preferably selected such that radius R at edge 8 is 100 to 400 cm, and in particular 200 to 350 cm. In the case where the length of the forming mold is, for example, 6–10 cm, this means that height difference H between the lowest median cross-section line of forming surface 7 and edges 11, 12 at two end faces 13, 14 of the forming mold is from 0.1 to 1 mm, and preferably 0.2 to 0.8 mm. In this case it is ensured that, as FIG. 2 shows in particular, edges 11, 12 are slightly above the surface of shaped cord 2. Thanks to these geometric dimensions, optimum results are obtained in the case of ordinary frame-like sections.

Figure 4:
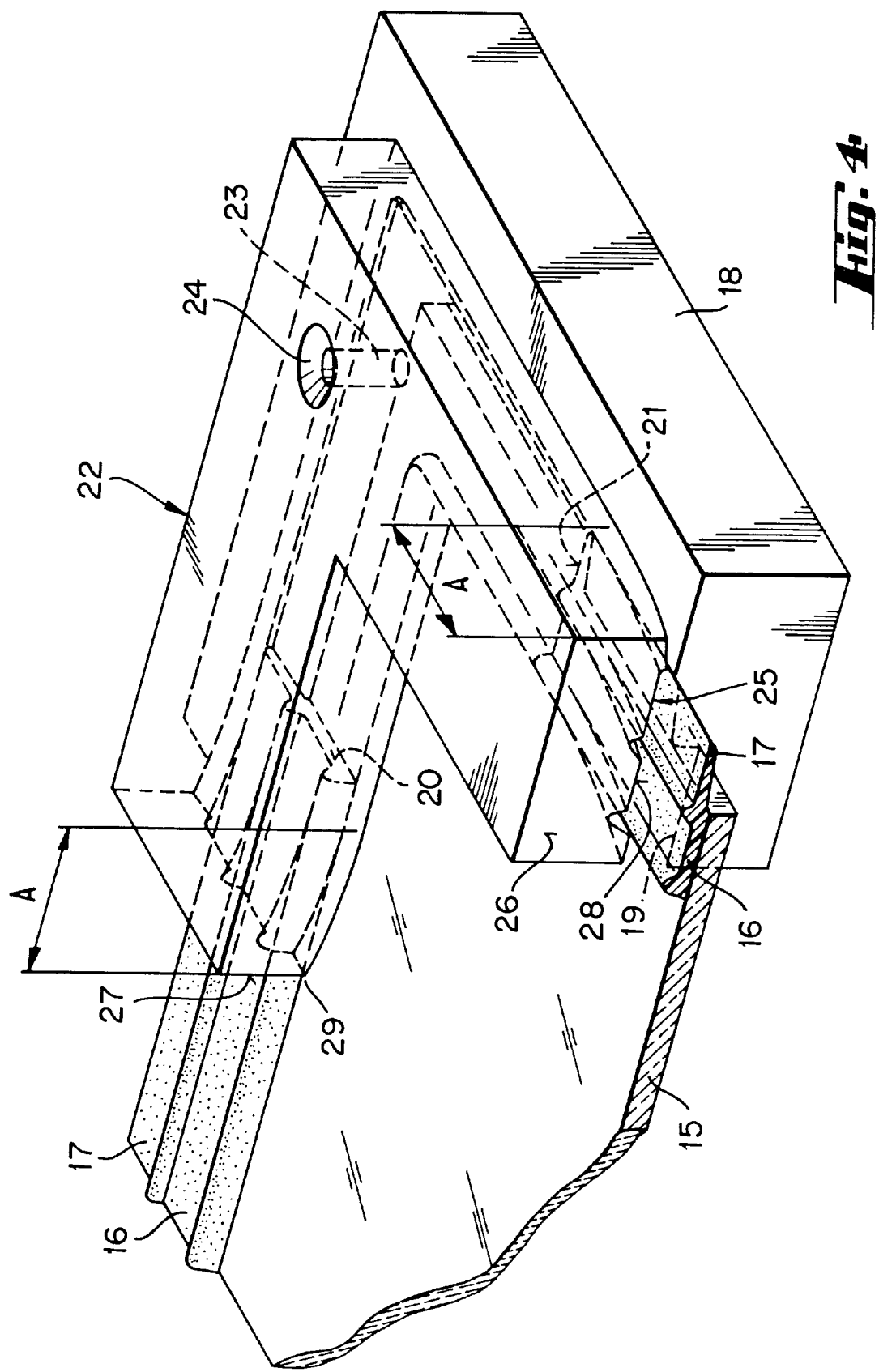
FIG. 4 shows a device according to the invention for postforming a polymer frame in the corner area of a glass using an injection molding process.

One embodiment of a device according to the invention that is helpful in later producing a frame-shaped section 16 that is extruded onto a glass 15 in the area of a sharp right-angled corner of the glass is shown in FIG. 4. Glass 15 is again inserted into a lower forming plate 18, which is equipped with a recess 19. Recess 19 corresponds to the contour of the edge of the glass and to the lower shape of lip 17.

Frame-shaped section 16, which can be composed of, for example, a hardening reaction system, was mechanically lifted from the corner area, in the process of being cut off at separation surfaces 20, 21 and removed from the glass surface.

In this case forming mold 22 is designed as an injection mold in which the hollow space that is bounded by the plate 18, the separation surfaces 20, 21 and the forming surface 25 is equipped, via a drilled hole 23, with an injection hole 24, through which the polymer is injected into the hollow molding space via a corresponding injection nozzle.

In its end parts, each of the two branches of forming mold 22 has a curvature, according to the invention, of length A. Length A corresponds approximately to the length of the part of frame-shaped section 16 that is covered by the forming mold. The radius of curvature of shaped forming surface 25 is again selected such that edges 28, 29 of forming surface 25 at end faces 26, 27 of the forming mold are always slightly above the surface of frame-shaped section 16 when the mold is closed.

What is claim is:

1. A forming mold for postforming a length of shaped polymer cord on an object, the forming mold comprising two ends, a first forming surface having a length (L) extending between two ends of the mold and being curved in an end area adjacent each end in the direction of the length of the shaped cord from a lower level inwardly of each end to a higher level at each end, and a second forming surface which suports the object and the cord, the second forming surface positioned in opposed relation to the first forming surface.

2. The forming mold according to claim 1, wherein the end areas of the forming mold are curved to a curvature selected to define a height difference between the lower level and the higher level which is between 0.1 and 1 mm.

3. The forming mold according to claim 1 or 2, wherein the forming mold is intended to be used for postforming the transition between a beginning and end of the shaped cord on the object along the edge thereof and that the forming surface is provided with a constant curvature having a radius (R) over all of length (L) of the forming mold.

4. The forming mold according to claim 1 or 2, for postforming a frame-shaped cord having a beginning end face and an ending end face spaced from each other on opposite sides of a corner of the object, wherein:
   a) the first forming surface of the mold is flat in a zone located between the end faces of the shaped cord.

5. The forming mold according to claim 1 or 2, further including:
   a) means for heating the forming mold to form by compression the frame-shaped cord (2) that is made of thermoplastic polymer.

6. The forming mold according to claim 1 or 2, wherein the forming mold is constructed as an injection mold and includes an injection hole.

7. A forming mold for postforming a length of shaped polymer cord which is positioned upon and rises a predetermined height above an object, the forming mold comprising:
   a) a first forming surface extending in a direction along the length of the cord, said forming surface having:
      i) a first section extending along said direction for, at least in part, engaging said object,
      ii) a second section extending along said direction and disposed laterally of said first section for overlying said cord when said first section is in engagement with said object, and
      iii) said second section having first and second portions extending along said direction, said first portion being disposed at a first height above said object which is less than said predetermined height and said second portion being disposed at a second height greater than said predetermined height, said first and second heights being measured when said first section is in engagement with said object; and
   b) a second forming surface which supports the object and the cord, the second forming surface positioned in opposed relation to the first forming surface.

8. The forming mold according to claim 7, wherein:
   a) said first section includes first and second portions disposed laterally of said first and second portions, respectively, of said second section; and
   b) the second portion of said first section is spaced above said object when said first portion of said first section is in engagement with said object.

9. The forming mold according to claim 8, wherein:
   a) the first and second portions of said first and second sections define a predetermined length extending along said direction; and
   b) said forming surface is curved in the direction of said predetermined length at a constant radius of curvature.

10. A forming mold for postforming a length of shaped polymer cord on an object, the forming mold comprising two ends and a first forming surface having a length (L) extending between the two ends of the mold and being curved in an end area adjacent each end in the direction of the length of the shaped cord from a lower level inwardly of each end to a higher level at each end, wherein the end areas of the forming mold have a curvature which defines a height difference between the lower level and the higher level of between 0.1 and 1 mm.

11. A forming mold for postforming the transition between a beginning and an end of a shaped polymer cord on an object along an edge thereof, the forming mold comprising two ends and a first forming surface having a length (L) extending between the two ends of the mold and being curved in an end area adjacent each end in the direction of the length of the shaped cord from a lower level inwardly of each end to a higher level at each end, wherein the first forming surface is provided with a constant curvature having a radius (R) over all of length (L) of the forming mold.

12. A forming mold for postforming a shaped polymer cord on an object, the cord having a beginning end face and an ending end face spaced from each other on opposite sides of a corner of the object, the forming mold comprising two ends and a first forming surface having a length (L) extending between the two ends of the mold and being curved in an end area adjacent each end in the direction of the length of the shaped cord from a lower level inwardly of each end to a higher level at each end, wherein the first forming surface is flat in a zone located between end faces of the shaped cord.

13. A forming mold for postforming a length of a shaped thermoplastic polymer cord on an object, the forming mold comprising two ends, a forming surface having a length (L) extending between two ends of the mold and being curved in an end area adjacent each end in the direction of the length of the shaped cord from a lower level inwardly of each end to a higher level at each end, and means for heating the forming mold to soften, form, and shape the thermoplastic polymer cord.

14. A forming mold for postforming a length of shaped polymer cord on an object, the forming mold comprising two ends, a forming surface having a length (L) extending between the two ends of the mold and being curved in an end area adjacent each end in the direction of the length of the shaped cord from a lower level inwardly of each end to an higher level at each end, and having a hole for injection of polymer into the mold.

15. The forming mold according to one of claims 1, 7, 10, 11, 12, 13 or 14, wherein the first forming surface includes first and second sharp edges which cut the polymer cord to a desired width and one or two recesses for forming one or two raised bumps on the polymer cord, wherein the recess or recesses are positioned between the first and second sharp edges.

* * * * *